(12) United States Patent
Kagetani et al.

(10) Patent No.: US 12,474,166 B2
(45) Date of Patent: Nov. 18, 2025

(54) PATTERN INSPECTION/MEASUREMENT DEVICE, AND PATTERN INSPECTION/MEASUREMENT PROGRAM

(71) Applicant: Hitachi High-Tech Corporation, Tokyo (JP)

(72) Inventors: Ryugo Kagetani, Tokyo (JP); Kaoru Fukaya, Tokyo (JP); Hiroyuki Shindo, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 340 days.

(21) Appl. No.: 17/926,651

(22) PCT Filed: May 25, 2020

(86) PCT No.: PCT/JP2020/020576
§ 371 (c)(1),
(2) Date: Nov. 21, 2022

(87) PCT Pub. No.: WO2021/240610
PCT Pub. Date: Dec. 2, 2021

(65) Prior Publication Data
US 2023/0194253 A1    Jun. 22, 2023

(51) Int. Cl.
*G01B 15/04*    (2006.01)
*G01N 23/2251*    (2018.01)

(52) U.S. Cl.
CPC ......... *G01B 15/04* (2013.01); *G01N 23/2251* (2013.01); *G01N 2223/6116* (2013.01)

(58) Field of Classification Search
USPC ........................................ 250/310
See application file for complete search history.

(56) References Cited

U.S. PATENT DOCUMENTS

| | | |
|---|---|---|
| 2007/0258636 A1 | 11/2007 | Kudou |
| 2008/0175469 A1 | 7/2008 | Toyoda et al. |
| 2012/0128231 A1 | 5/2012 | Hwang |

(Continued)

FOREIGN PATENT DOCUMENTS

| | | |
|---|---|---|
| CN | 101127119 A | 2/2008 |
| JP | 11-201919 A | 7/1999 |
| JP | 2003-194734 A | 7/2003 |

(Continued)

OTHER PUBLICATIONS

International Search Report (PCT/ISA/210) issued in PCT Application No. PCT/JP2020/020576 dated Aug. 4, 2020 with English translation (four (4) pages).

(Continued)

*Primary Examiner* — Kiet T Nguyen
(74) *Attorney, Agent, or Firm* — Crowell & Moring LLP

(57) ABSTRACT

An object of the disclosure is to provide a pattern inspection and measurement apparatus that can accurately specify a corner point formed on a sample. The pattern inspection and measurement apparatus according to the disclosure specifies a pair of corner points as a corner pair candidate on design data, and specifies a corner point on an actually formed shape pattern in accordance with a relative relation between the corner pair candidate on the design data and the corner pair candidate in the shape pattern (see FIG. 13).

15 Claims, 18 Drawing Sheets

(56) References Cited

U.S. PATENT DOCUMENTS

2013/0044347 A1* 2/2013 Kitai .................... H04N 1/4092
                                                            358/1.14
2013/0248709 A1* 9/2013 Yamamoto .............. G06T 7/001
                                                             250/309

FOREIGN PATENT DOCUMENTS

| JP | 4644210 B2 | 3/2011 |
|----|------------|--------|
| JP | 2012-112951 A | 6/2012 |
| TW | 200622188 A | 7/2006 |

OTHER PUBLICATIONS

Japanese-language Written Opinion (PCT/ISA/237) issued in PCT Application No. PCT/JP2020/020576 dated Aug. 4, 2020 (three (3) pages).
Taiwanese-language Office Action issued in Taiwanese Application No. 110109950 dated Jan. 4, 2022 (four (4) pages).
Office Action issued in Chines Patent Application No. 202080101151.X dated Mar. 14, 2025, with English translation, 19 pages.
Office Action issued in Korean Patent Application No. 10-2022-7040602 dated Sep. 7, 2024, with English translation, 10 pages.

* cited by examiner

FIG. 9B
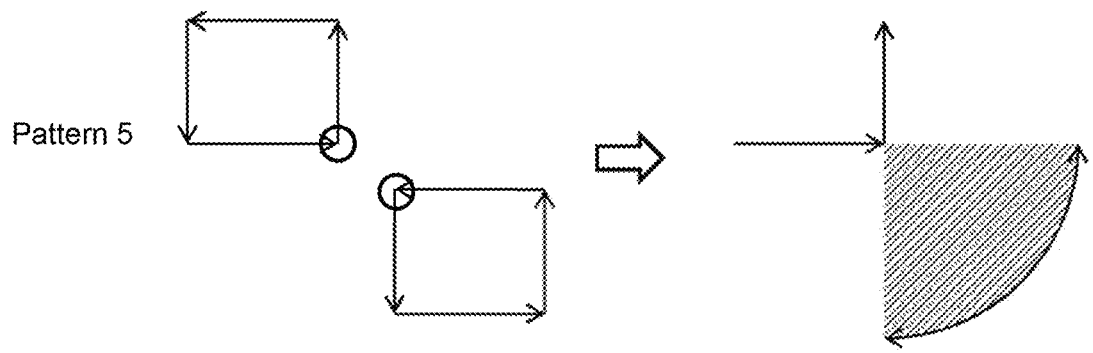
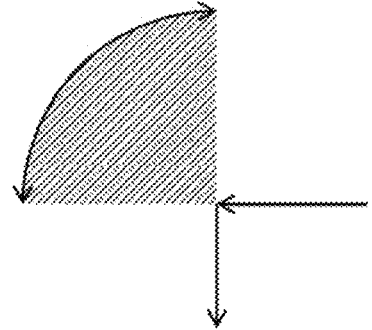

FIG. 9E
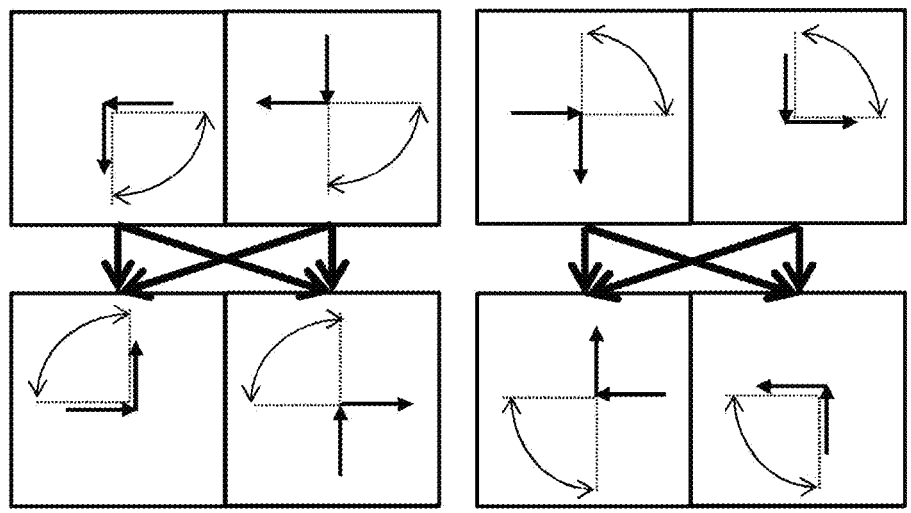
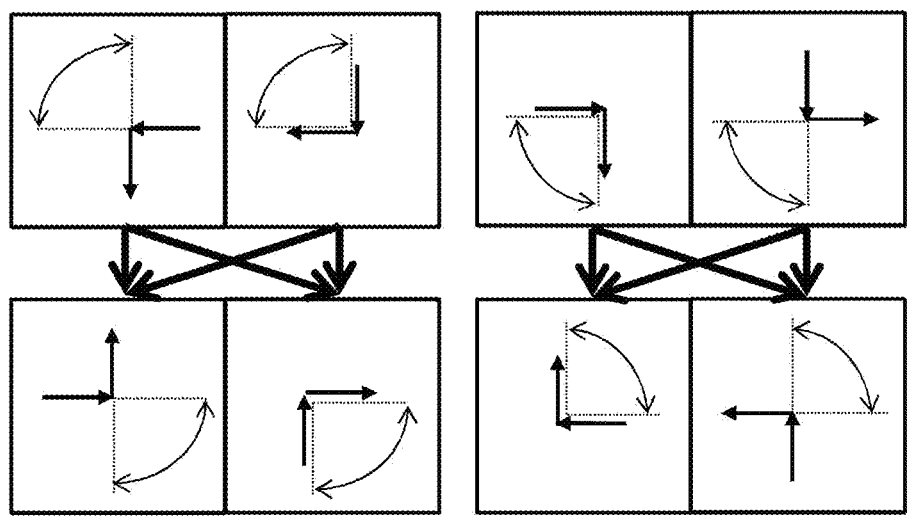

FIG. 12
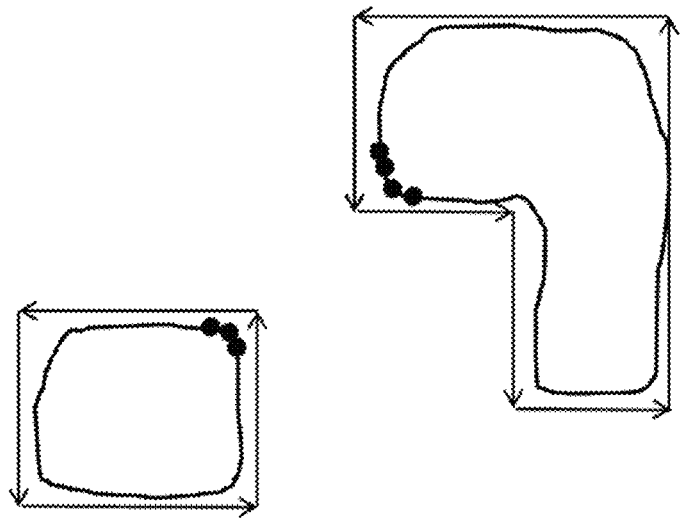
FIG. 13
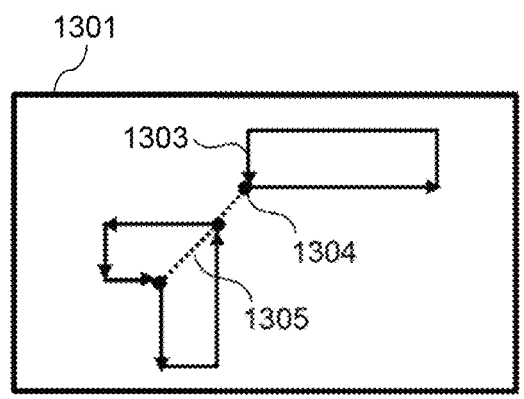
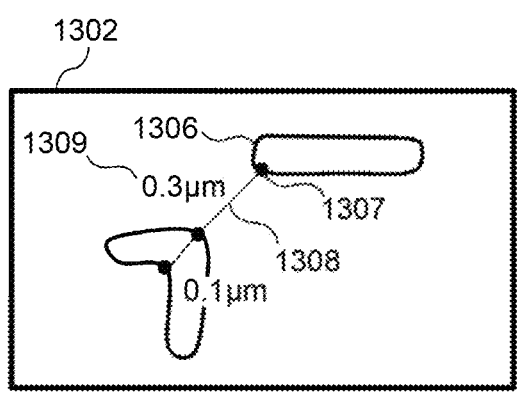

PATTERN INSPECTION/MEASUREMENT DEVICE, AND PATTERN INSPECTION/MEASUREMENT PROGRAM

TECHNICAL FIELD

The present disclosure relates to a pattern inspection and measurement apparatus that inspects or measures a shape pattern formed on a sample.

BACKGROUND ART

In general, a circuit pattern on a semiconductor integrated circuit is inspected and measured in manufacturing steps of a semiconductor. As one of methods of inspecting and measuring the circuit pattern, there is a method of using computer aided design (CAD) data, which is design data of the circuit pattern, as a reference pattern. In the method, a captured image of an actually formed circuit pattern (for example, an SEM image captured by a scanning electron microscope) is compared with CAD data to evaluate the circuit pattern.

In a semiconductor manufacturing process, a circuit pattern formed on a wafer is not the same as a design shape, and a shape measurement is performed to evaluate a final quality of the circuit pattern.

When the circuit pattern is evaluated, an inter-pattern distance may be measured. As the inter-pattern distance measurement, there is a method using design data and a method not using design data. PTL 1 describes the inter-pattern distance measurement not using design data.

CITATION LIST

Patent Literature

PTL 1: JP-A-H11-201919

SUMMARY OF INVENTION

Technical Problem

In recent years, semiconductor devices have been miniaturized, and the likelihood of pattern variations in a circuit pattern has been narrowed. Accordingly, it is necessary to measure not only a line portion but also a corner portion or a distance between adjacent patterns. This is because these parameters are more likely to deviate from the design data due to the miniaturization of the manufacturing process. For example, a distance between diagonal corner points of one closed area pattern and a distance between corner points of two closed area patterns, which face each other, are relatively likely to deviate from the design data.

The corner points are formed to be sharp (for example, at a right angle) on the design data, but the corner points actually formed by the manufacturing process are not necessarily clearly identifiable, and may have, for example, a chamfered shape. It has been difficult to identify the corner points themselves or a distance between the corner points due to such properties of the corner points in an evaluation method of the related art as disclosed in PTL 1.

The disclosure has been made in view of the above problems, and an object thereof is to provide a pattern inspection and measurement apparatus that can accurately specify a corner point formed on a sample.

Solution to Problem

A pattern inspection and measurement apparatus according to the disclosure specifies a pair of corner points as a corner pair candidate on design data, and specifies a corner point on an actually formed shape pattern in accordance with a relative relation between the corner pair candidate on the design data and the corner pair candidate in the shape pattern.

Advantageous Effects of Invention

According to the pattern inspection and measurement apparatus of the present disclosure, a corner point formed on a sample can be accurately specified. Other configurations, problems, advantages, and the like will become apparent from the following description of embodiments.

BRIEF DESCRIPTION OF DRAWINGS

FIG. 9B shows an example of narrowing down corner pair candidates in S403.

FIG. 9E shows results obtained by organizing FIGS. 9A to 9D.

FIG. 12 is a diagram showing a specific example of S210.

FIG. 13 is an example of a screen interface (GUI) provided by a computer system 116.

DESCRIPTION OF EMBODIMENTS

First Embodiment

Figure 1:
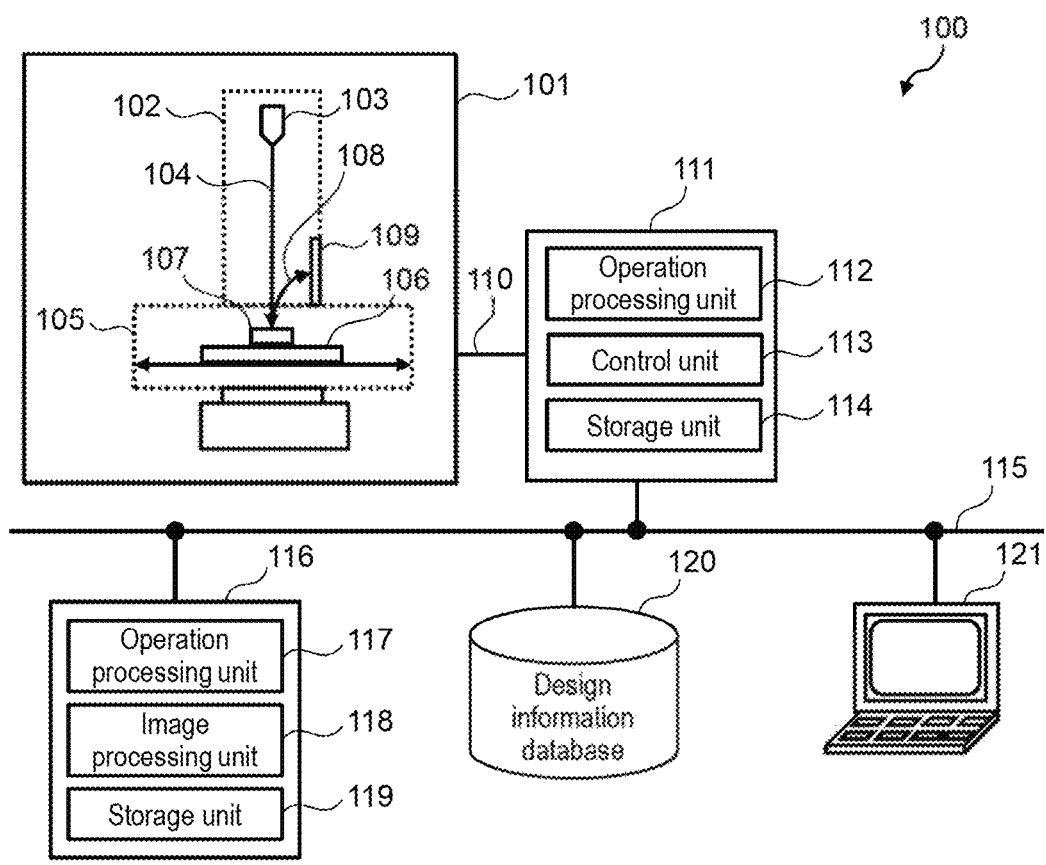
FIG. 1 is a configuration diagram of a pattern inspection and measurement system 100.

FIG. 1 is a configuration diagram of a pattern inspection and measurement system 100. The pattern inspection and measurement system 100 is a system that inspects and measures a shape pattern formed on a semiconductor sample. The pattern inspection and measurement system 100 includes a scanning electron microscope (SEM) 101, computer systems 111 and 116, a design information database 120, and an input/output device 121. These components are connected to one another via a network 115.

The SEM 101 captures an image of a shape pattern formed on a sample by emitting an electron beam to the sample. The SEM 101 includes an electron beam column 102, a vacuum sample chamber 105, and an XY stage 106. During pattern inspection, an electron beam 104 is emitted from an electron source 103 to a sample 107 such as a wafer on which a device is manufactured. The emitted electron beam is converged by using a plurality of stages of lenses, and deflection scanning is performed with the emitted electron beam by using a scanning deflector. Accordingly, a surface of the sample 107 is scanned one-dimensionally or two-dimensionally with the electron beam 104. Electrons 108 (secondary electrons or backscattered electrons) emitted from the sample by the scanning with the electron beam 104 are detected by a detector and converted into a digital signal by an A/D converter 109. The digital signal is received by the computer system 111 via a network 110 and stored in a storage unit 114.

The computer system 111 is connected to the SEM 101 via the network 110. The computer system 111 controls various modules such as the electron beam column 102, the vacuum sample chamber 105, and the XY stage 106 of the apparatus by a control unit 113. During the pattern inspection, an operation processing unit 112 acquires, by executing signal processing or image processing using the digital signal stored in the storage unit 114, information to be measured (for example, an SEM image).

The operation processing unit 112 creates a program (recipe) for controlling an operation of the SEM 101 based on design data of a semiconductor device. That is, the operation processing unit 112 also functions as a recipe setting unit of the SEM 101. Specifically, the operation processing unit 112 sets position information (for example, design data, pattern contour line data, desired measurement points in simulated design data, an autofocus point, an autostigma point, an addressing point, and the like) for causing the SEM 101 to execute necessary processing, and controls the XY stage 106, the deflector, and the like based on the setting.

The computer system 116 processes the measurement result (such as an SEM image) acquired by the computer system 111. Specifically, the operation processing unit 117 executes processing (for example, measurement of an inter-corner point distance to be described later) for inspecting a shape pattern on the sample 107 using the measurement result. An image processing unit 118 executes image processing associated with the pattern inspection. A storage unit 119 stores a processing result.

The design information database 120 stores design information (hereinafter, referred to as design data) of a semiconductor circuit pattern formed on the sample 107. The design data records shapes, coordinates, and the like of circuit patterns formed on layers of a stacked circuit pattern. The design information database 120 can be implemented by storing the design data in a storage device.

The input/output device 121 is an operation terminal for a user to perform various operations of the SEM 101 including a recipe execution operation and a recipe creation operation of the computer system 111. The input/output device 121 is connected to the computer system 116 and instructs processing such as measurement processing and statistical processing. The input/output device 121 can further access the design information database 120 to inquire, acquire, store, and create design data.

In the following description, a vertex at which an angle between two line segments in the design data is a right angle is referred to as a corner point. The corner pair refers to a combination of two corner points. The computer system 116 inspects the sample 107 by specifying corner points and calculating a distance between the corner points in accordance with a procedure to be described later.

Figure 2:
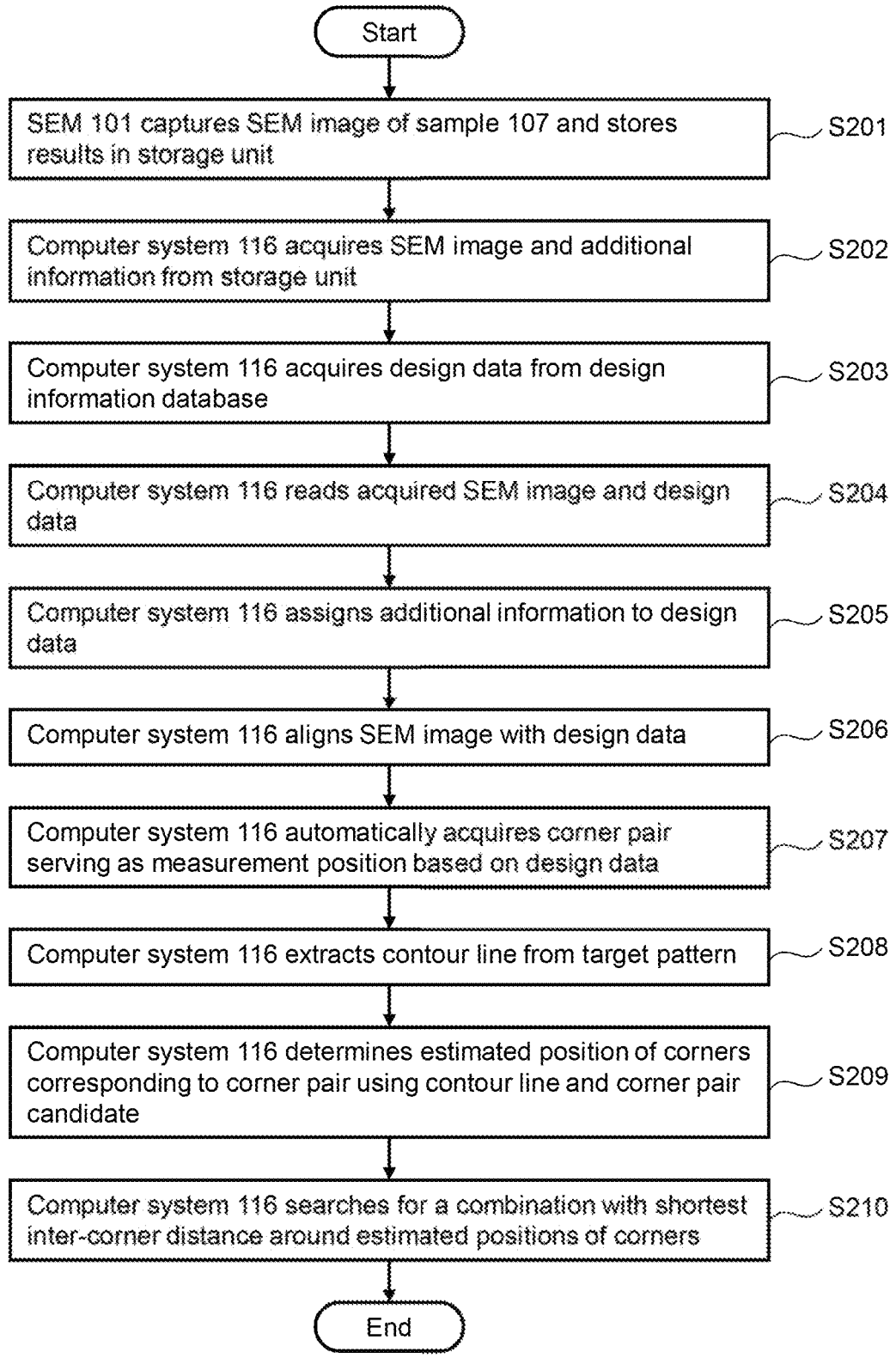
FIG. 2 is a flowchart illustrating a procedure of specifying a corner pair on a sample 107 by the pattern inspection and measurement system 100.

FIG. 2 is a flowchart illustrating a procedure of specifying a corner pair on the sample 107 by the pattern inspection and measurement system 100. Steps in FIG. 2 will be described below.

(FIG. 2: Step S201)

The SEM 101 captures an SEM image of the sample 107 in accordance with a recipe created based on a recipe creation function of the operation processing unit 112. The control unit 113 stores the SEM image in the storage unit 114 and stores additional information such as imaging conditions in the storage unit 114.

(FIG. 2: Steps S202 to S204)

The computer system 116 acquires the SEM image and the additional information stored in the storage unit 114 of the computer system 111 via the network (S202). The computer system 116 acquires design data corresponding to the SEM image from the design information database 120 (S203), and reads the SEM image and the design data (S204).

(FIG. 2: Step S205)

The computer system 116 sets additional information for the read design data. The additional information in this step is assigned to distinguish whether the shape pattern formed on the design data is a protruding pattern or a recessed pattern, which will be described later. A specific example will be described with reference to FIG. 3.

(FIG. 2: Step S206)

The computer system 116 performs alignment processing between the read SEM image and the design data. As an alignment method, a known method such as template matching and pattern matching using a normalized correlation method can be used.

(FIG. 2: Step S207)

The computer system 116 automatically acquires a corner pair serving as a measurement position candidate by using the design data subjected to the alignment with the SEM image in S206. The details of this step will be described with reference to FIG. 4.

(FIG. 2: Step S208)

By using an SEM image obtained by capturing an image of a circuit pattern that is an inspection target, the computer system 116 extracts a contour line of the circuit pattern. The details of this step will be described with reference to FIG. 11.

(FIG. 2: Step S209)

By using the corner pair candidate on the design data acquired in S207 and the contour line extracted in S208, the computer system 116 specifies points (or areas) on the contour line corresponding to corner points forming the corner pair candidate. The computer system 116 sets the specified position as an estimated position of a corner point on an actual shape pattern.

(FIG. 2: Step S209: Supplement)

In this step, as a method of estimating a position of the corner point from the contour line, it is possible to use a method of estimating the position of the corner point by searching for a corresponding point in any direction from a target corner point, a method of setting an intersection point between a straight line passing through the target corner point with any angle and the contour line as a corresponding point and setting a position of the intersection point as the estimated position of the corner point, or the like. However, in the method, the position of the corner point cannot be estimated or may be erroneously detected. Therefore, a distance conversion image of the acquired contour line may be created, and gradation-direction weights of the distance conversion image may be added to the searching direction to reduce the possibility of erroneous detection or the like. The distance conversion image is an image in which a distance to the nearest contour line is set as a luminance value based on contour line information, and the luminance value decreases as approaching the contour line.

(FIG. 2: Step S210)

The computer system 116 searches for a combination of points with the shortest inter-corner distance around estimated positions of corners that are present as a pair, and acquires a combination having the smallest distance. The smallest distance acquired in this step is defined as the inter-corner distance. An example of this step will be described with reference to FIG. 12.

Figure 3:
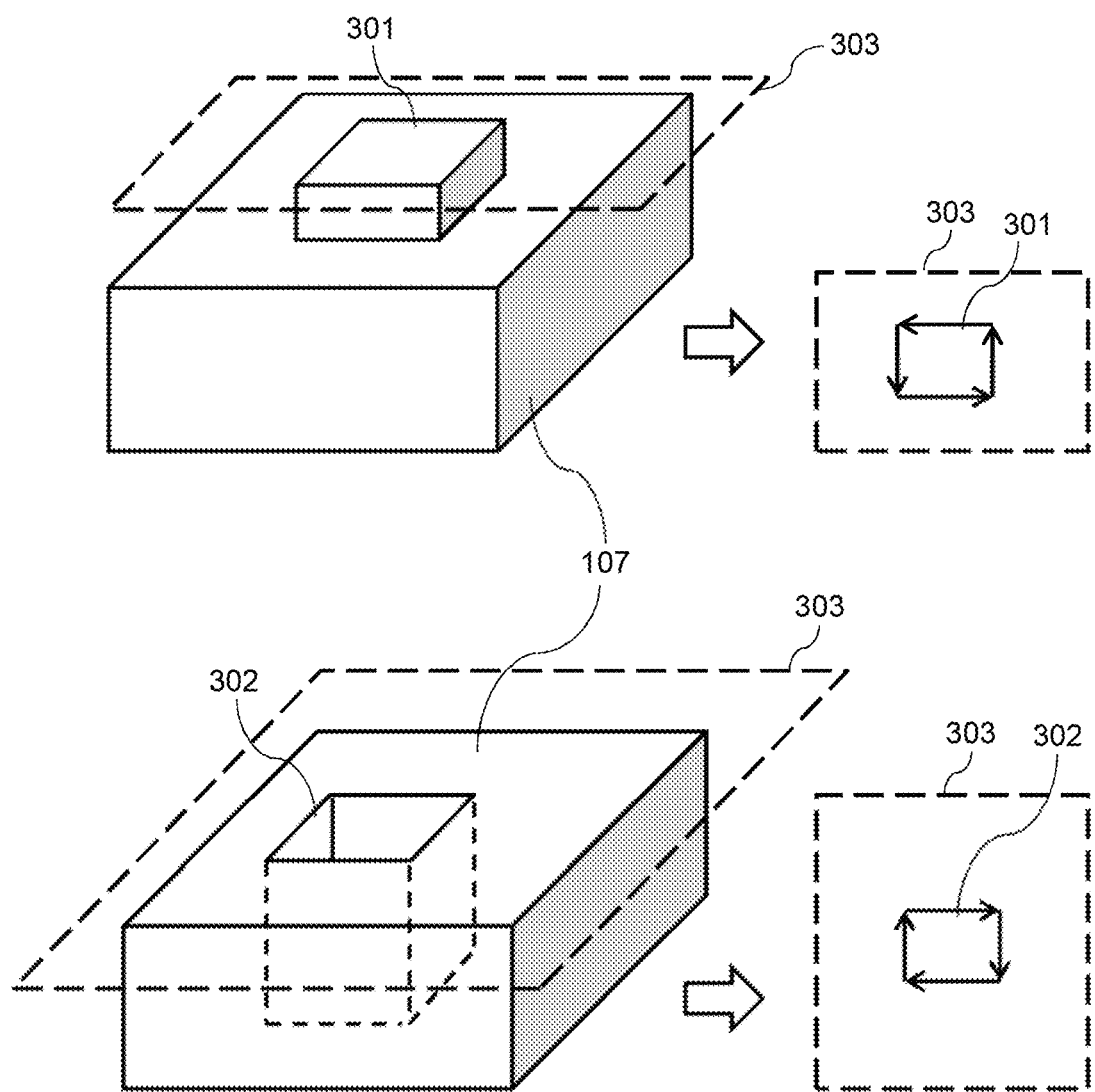
FIG. 3 is a schematic diagram illustrating additional information assigned to design data in S205.

FIG. 3 is a schematic diagram illustrating the additional information assigned to the design data in S205. Three-dimensional shape pattern 301 or 302 is formed on the sample 107. These shape patterns each form a rectangular closed area in a plane. The three-dimensional shape pattern 301 is a protruding pattern, and the three-dimensional shape pattern 302 is a recessed pattern. Therefore, when the sample 107 is cut along an inspection plane 303, the closed area of the three-dimensional shape pattern 301 is filled with a material, and the closed area of the three-dimensional shape pattern 302 is not filled with the material.

In S205, the additional information is assigned to distinguish between the protruding pattern and the recessed pattern illustrated in FIG. 3. However, the design data records a two-dimensional shape, and thus it is necessary to devise the design data in order to represent a three-dimensional attribute. Therefore, attention is paid to line segments forming the closed area. Specifically, it is assumed that the line segments are rotated in a counterclockwise direction in the protruding pattern, and it is assumed that the line segments are rotated in a clockwise direction in the recessed pattern. In S205, a rotation direction attribute is assigned to each shape pattern on the design data for convenience to distinguish between the protruding pattern and the recessed pattern.

Figure 4:
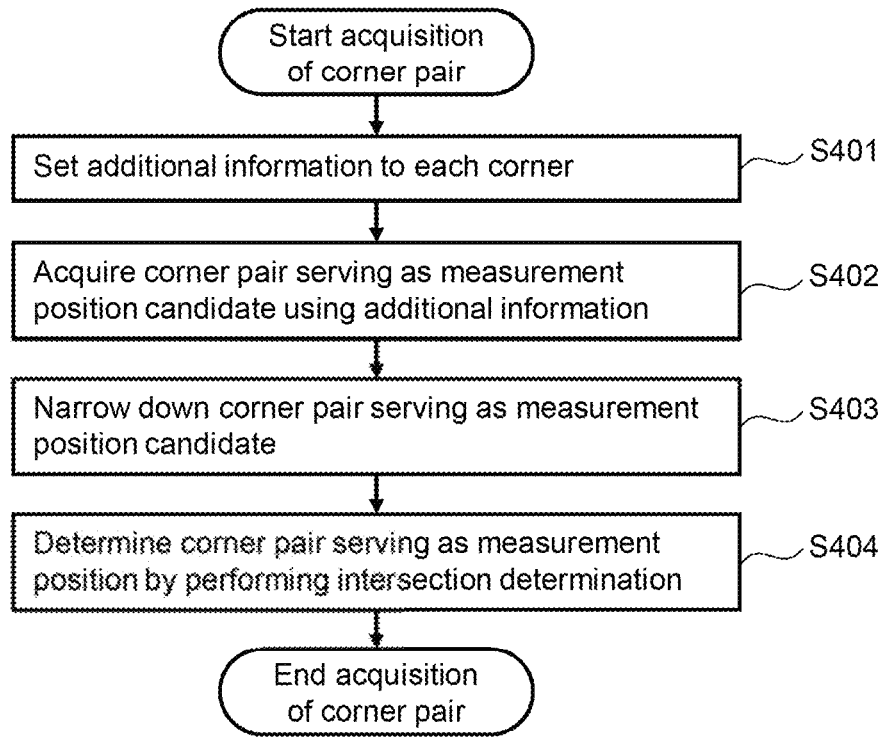
FIG. 4 is a flowchart illustrating details of S207.

FIG. 4 is a flowchart illustrating details of S207. Each step in FIG. 4 will be described below.

(FIG. 4: Step S401)

The computer system 116 assigns additional information described below to corner points on the design data.

(FIG. 4: Step S401: Additional Information 1)

The computer system 116 classifies the corner points on the design data into eight types based on the rotation direction shown in FIG. 3. A specific example of the additional information will be described with reference to FIG. 5. The additional information is assigned for convenience in subsequent processing and is necessary for the operation processing.

(FIG. 4: Step S401: Additional Information 2)

For example, an optical proximity correction (OPC) pattern corresponds to a case where a minute step, which is not intended to be formed as a corner point, may be formed on an actually formed shape pattern. The computer system 116 assigns, to a corner point formed by such a minute step, a non-target attribute indicating that the corner point is excluded from an inspection target. A specific example of the attribute will be described with reference to FIG. 6A.

(FIG. 4: Step S401: Additional Information 3)

When a step is not as small as that of the OPC pattern and a distance between adjacent corners is small, the number of corner pairs for which the inter-corner point distance is measured may be extremely increased. Therefore, the computer system 116 assigns a dense attribute to such a dense corner group. A specific example of the attribute will be described with reference to FIG. 6B. An example of how to use the attribute will be described in a second embodiment.

(FIG. 4: Step S401: Additional Information 4)

The computer system 116 assigns a normal attribute to a corner point that does not belong to either the non-target attribute or the dense attribute. The normal attribute means a corner point as a target for which the inter-corner point distance is measured.

(FIG. 4: Step S401: Additional Information 5)

The computer system 116 calculates, for each corner point, polar coordinates having an upper left corner of the design data as an origin, and assigns the polar coordinates as the position information of each corner. An example of the polar coordinates will be described with reference to FIG. 7.

(FIG. 4: Step S402)

The computer system 116 specifies, by using the additional information set in S301, a candidate (hereinafter, referred to as a corner pair candidate) for which the inter-corner point distance is measured. The corner pair candidate is one of (a) two diagonally arranged corner points in one closed area and (b) two corner points arranged in a manner of facing each other, among corner points that two closed areas include respectively. A specific example of this step will be described with reference to FIGS. 8A to 8E.

(FIG. 4: Step S402: Supplement)

The computer system 116 excludes the corner point to which the non-target attribute is assigned from the corner pair candidate. Since the computer system 116 sets only two diagonally arranged corner points as the corner pair candidate in the above (a), two adjacent corner points are excluded from the corner pair candidate. The computer system 116 regards overlapping corner point pairs as one corner point pair, such as a pair of corner point 1: corner point 2 and a pair of corner point 2: corner point 1, and adopts only one corner point pair. The same applies to S403.

(FIG. 4: Step S403)

The computer system 116 narrows down, from among corner pair candidates, corner pairs for which the inter-corner point distance is measured. Specifically, in (a) of S402, only two corner points included within a threshold distance in coordinate areas having a diagonal arrangement relation are adopted as measurement targets, and in (b) of S402, only two corner points included within the threshold distance in coordinate areas having a facing arrangement relation are adopted as measurement targets. A specific example of this step will be described with reference to FIGS. 9A to 9E.

(FIG. 4: Step S403: Supplement)

In this step, the computer system 116 adopts all corner points included within the threshold distance as measurement targets. Therefore, a plurality of corner pair candidates may be present within the threshold distance.

(FIG. 4: Step S404)

In a case where a line segment connecting two corner points adopted as a corner pair candidate intersects a line segment forming the shape pattern, the computer system 116 excludes the two corner points from the corner pair candidates. An example of this step will be described with reference to FIG. 10.

Figure 5:
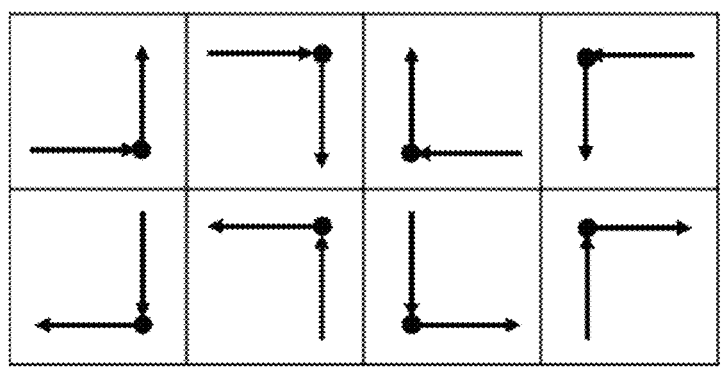
FIG. 5 is a diagram showing a specific example of additional information assigned in S401.

FIG. 5 is a diagram showing a specific example of the additional information 1 added in S401. There are four types of corner points including a lower right end portion of a rectangle, an upper right end portion thereof, a lower left end portion thereof, and an upper left end portion thereof. The left rotation and the right rotation shown in FIG. 3 are present for each corner point. Therefore, corner points on the design data can be classified into eight types shown in FIG. 5.

Figure 6A:
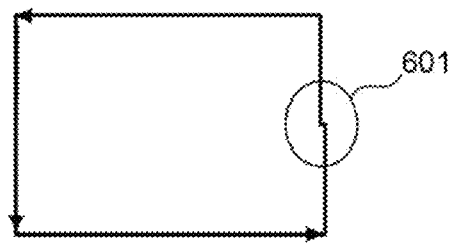
FIG. 6A shows an example of a minute step.

FIG. 6A shows an example of a minute step. In order to exclude the minute step, the computer system 116 may determine whether a distance between corner points is less than a threshold (first threshold). When the distance is less than the first threshold, the minute step can be determined. In S401, the computer system 116 assigns the non-target attribute to two corner points, the distance between which is less than the first threshold.

Figure 6B:
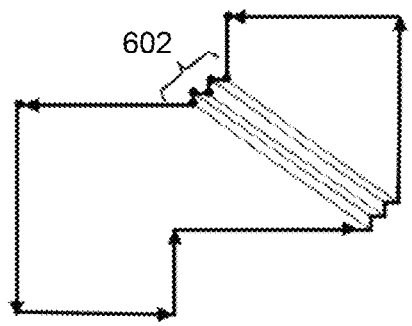
FIG. 6B shows an example of a dense corner group 602.

FIG. 6B shows an example of a dense corner group 602. The dense corner group 602 is formed by densely arranging a large number of corner points within a close range. In order to measure the inter-corner point distance, it is considered sufficient to measure the distance between any two corner points of the dense corner group. This is because distances between the other corner points are also substantially the same. In S401, the computer system 116 assigns the dense attribute to two corner points that satisfy an expression of the first threshold≤the inter-corner point distance<a second threshold.

Figure 7:
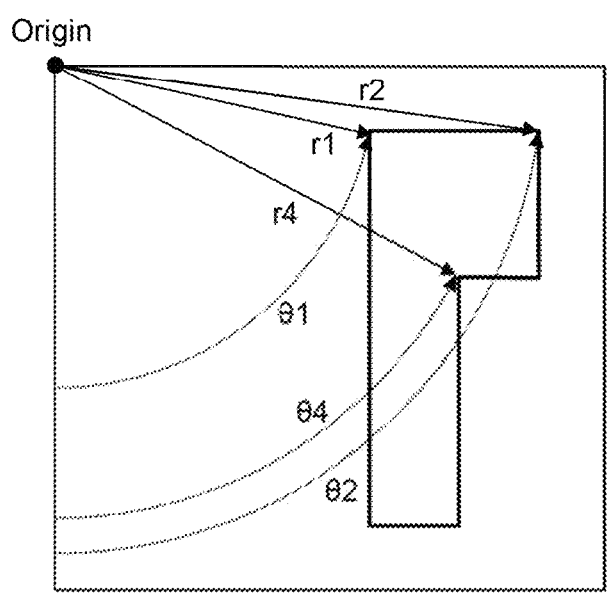
FIG. 7 shows an example of polar coordinates.

FIG. 7 shows an example of polar coordinates. The upper left of the design data is set as the origin, and the coordinates of the corner points are represented by the distance and the angle. In the processing to be described later with reference to FIGS. 8 and 9, the polar coordinates are easier to calculate, so that the polar coordinates are calculated in advance in S401 and assigned as additional information.

Figure 8A:
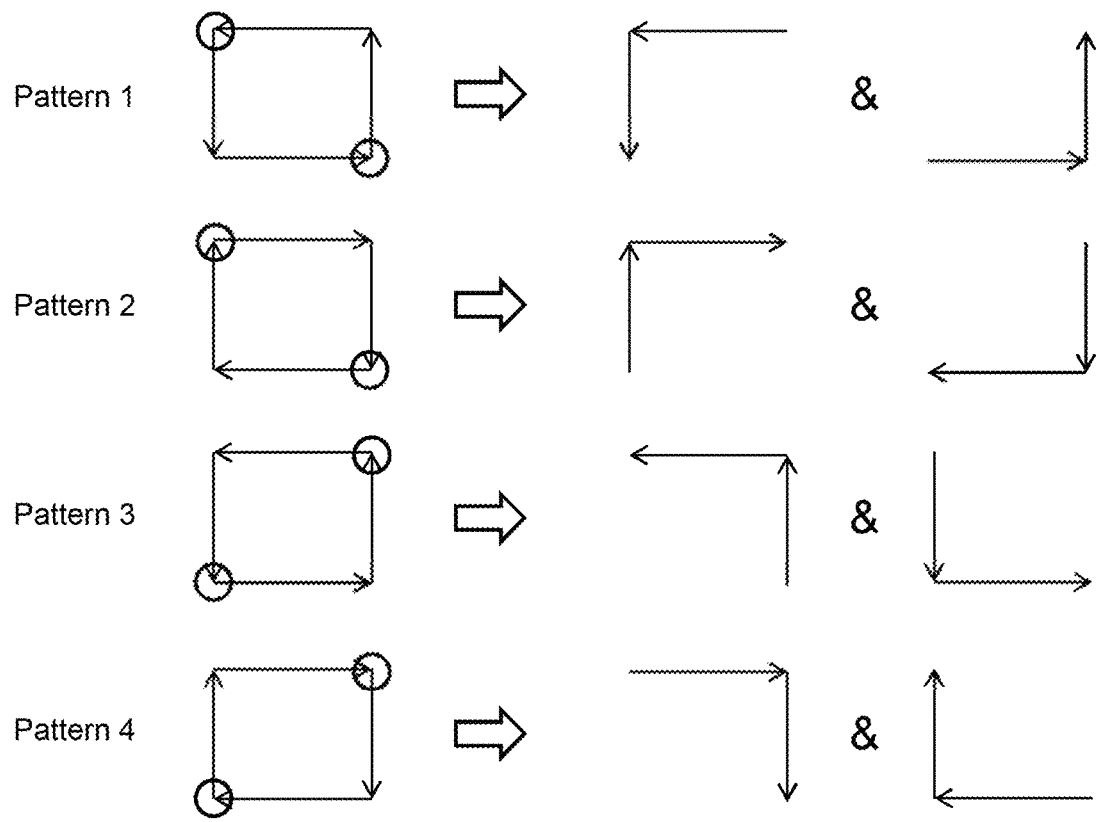
FIG. 8A shows an example of specifying corner pair candidates in S402.

FIG. 8A shows an example in which corner pair candidates are specified in S402. An upper left corner point and a lower right corner point of a rectangular closed area of one protruding pattern are set as a corner pair candidate (pattern 1). The same also applies to a recessed pattern (pattern 2). Similarly, an upper right corner point and a lower left corner point of a rectangular area of one protruding pattern are set as a corner pair candidate (pattern 3). The same also applies to the recessed pattern (pattern 4). According to the above, directions of line segments around the corner points forming the corner pair candidates in FIG. 8A are limited to four combinations of line segment patterns shown on the right side of FIG. 8A.

Figure 8B:
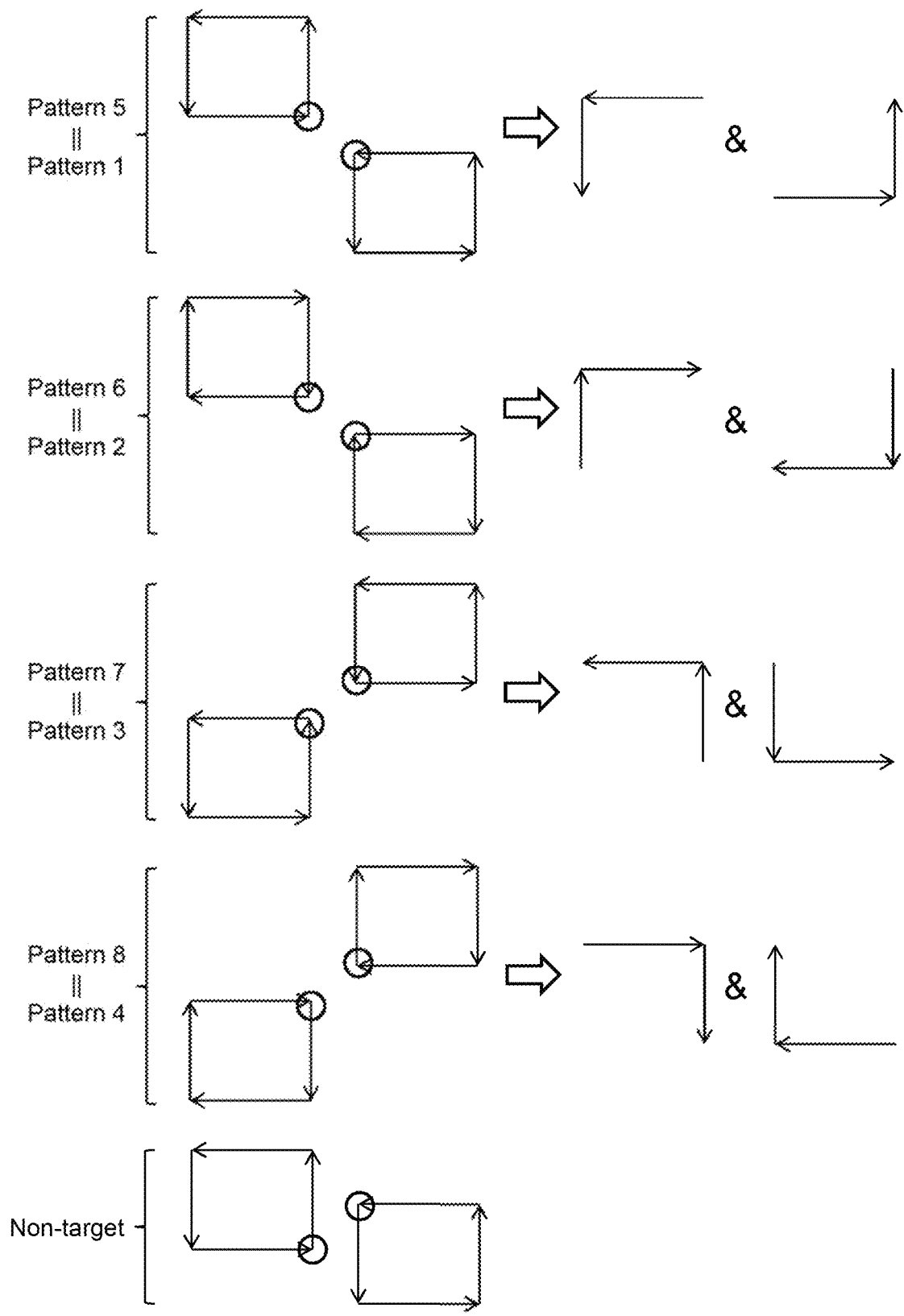
FIG. 8B shows an example of specifying corner pair candidates in S402.

FIG. 8B shows an example in which corner pair candidates are specified in S402. In a pattern 5 of FIG. 8B, a first protruding pattern is arranged at the upper left, and a second protruding pattern is arranged at the lower right. A lower right corner point of the first protruding pattern and an upper left corner point of the second protruding pattern are arranged in a manner of facing each other. The two corner points having such an arrangement relation are also set as a corner pair candidate. Here, in this case, the directions of the line segments around the corner points forming the corner pair candidate are exactly the same as those of the pattern 1 (note: although the directions of the line segments are the same, the search range to be described later is different from that of the pattern 1. The same applies to a pattern 6 and subsequent patterns). Similarly, regarding the pattern 6 and the subsequent patterns, the directions of the line segments around the corner points forming the corner pair candidate are exactly the same as those in FIG. 8A.

In a case where a first protruding pattern is arranged at the lower left and a second protruding pattern is arranged at the upper right, a positional relation is the same as that of the pattern 7. Therefore, it is not necessary to consider the positional relation. That is, it is enough to consider only four positional relations shown in FIG. 8B.

A non-target pattern in FIG. 8B shows an example of two corner points that are not arranged in a manner of facing each other. Here, the facing arrangement refers to a positional relation in which a line extends in a protruding direction of one corner point, and in this case, the other corner point is arranged on the line. Corner points that do not face each other as shown in the non-target pattern of FIG. 8B are excluded from the corner pair candidates in the first embodiment. The shape pattern having such a positional relation may be inspected by an inspection method different from that of the disclosure.

Figure 8C:
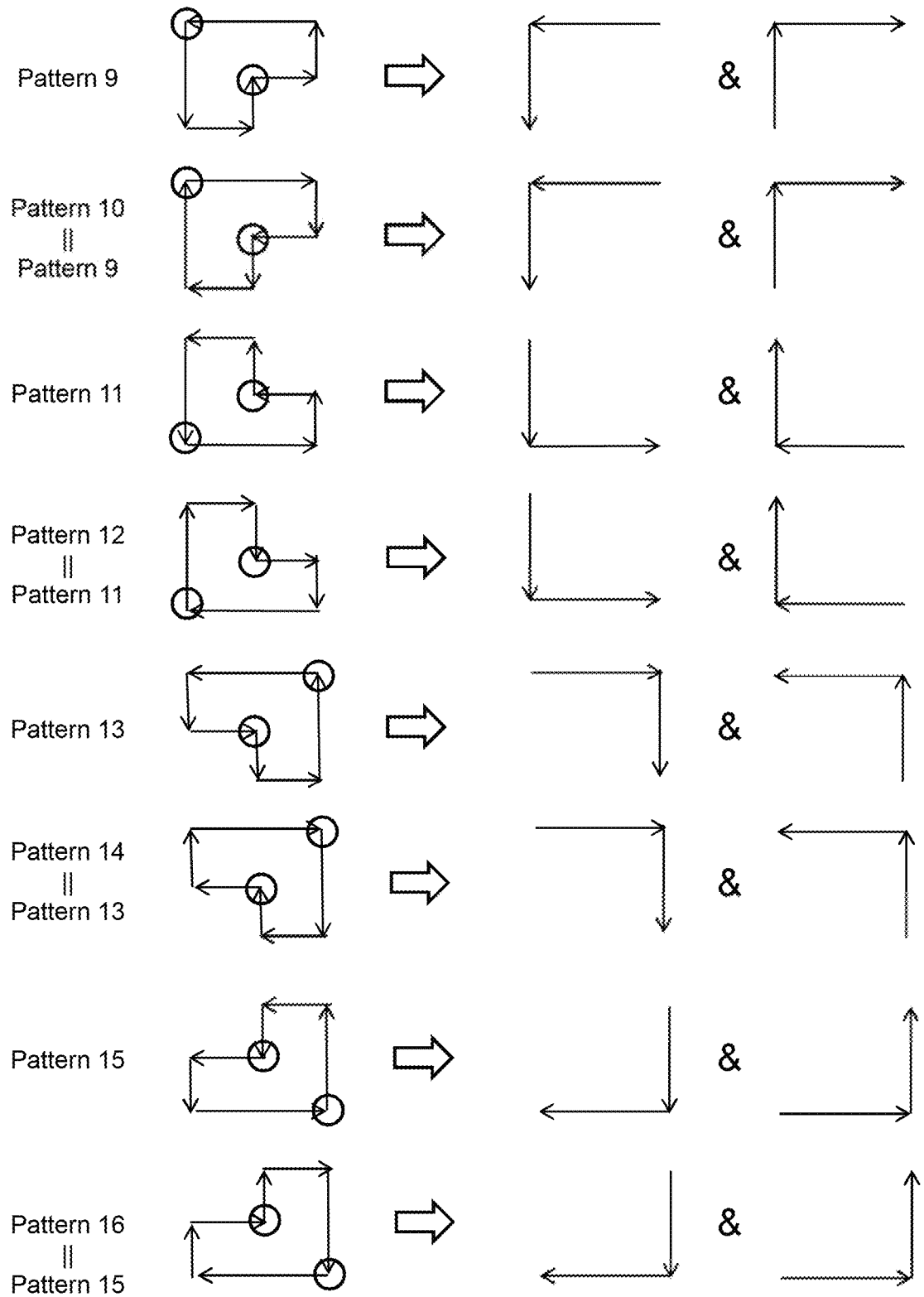
FIG. 8C shows an example of specifying corner pair candidates in S402.

FIG. 8C shows an example in which corner pair candidates are specified in S402. In a pattern 9 of FIG. 8C, a point corresponding to a lower right corner point protrudes toward an inside of a closed area. In such a shape pattern, an upper left corner point and the lower right corner point are also set as a corner pair candidate. A pattern 10 represents a recessed pattern having the same shape as the pattern 9. The directions of line segments around corner points forming a corner pair candidate in the pattern 10 is exactly the same as those in the pattern 9. Similarly, in a pattern 11 and subsequent patterns, two diagonally arranged corner points are set as a corner pair candidate.

In the pattern 9, a relation between the upper left corner point and a lower corner point on a right side is the same as that in the pattern 1, so that it is not necessary to consider the relation here. A relation between the upper left corner point and a right corner point on a lower side in the pattern 9 is also the same as that in the pattern 1. Similarly, in the pattern 10 and the subsequent patterns, it is not necessary to consider overlapping line segment pairs.

Figure 8D:
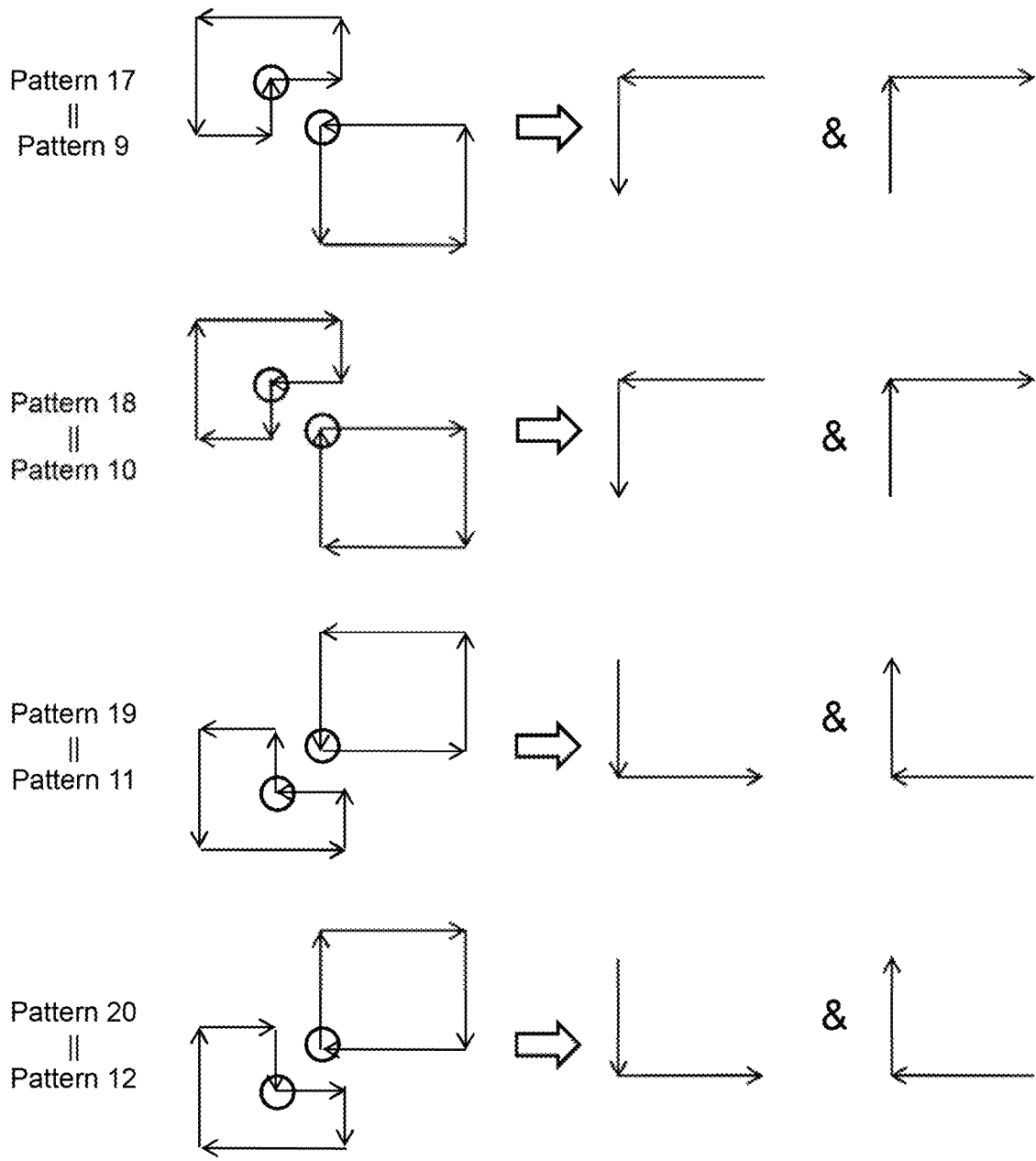
FIG. 8D shows an example of specifying corner pair candidates in S402.

FIG. 8D shows an example in which corner pair candidates are specified in S402. In a pattern 17 of FIG. 8D, a first protruding pattern is arranged at the upper left, and a second protruding pattern is arranged at the lower right. A lower right corner point of the first protruding pattern protrudes toward an inside of a closed area similarly to the pattern 9. A lower right corner point of the first protruding pattern and an upper left corner point of the second protruding pattern are arranged in a manner of facing each other. The two corner points having such an arrangement relation are also set as a corner pair candidate. Here, in this case, the directions of the line segments around the corner points forming the corner pair candidate are exactly the same as those of the pattern 9. Similarly, regarding a pattern 18 and subsequent patterns (corresponding to the patterns 10 to 16), the directions of the line segments around the corner points forming the corner pair candidate are exactly the same as those in FIG. 8C.

Figure 8E:
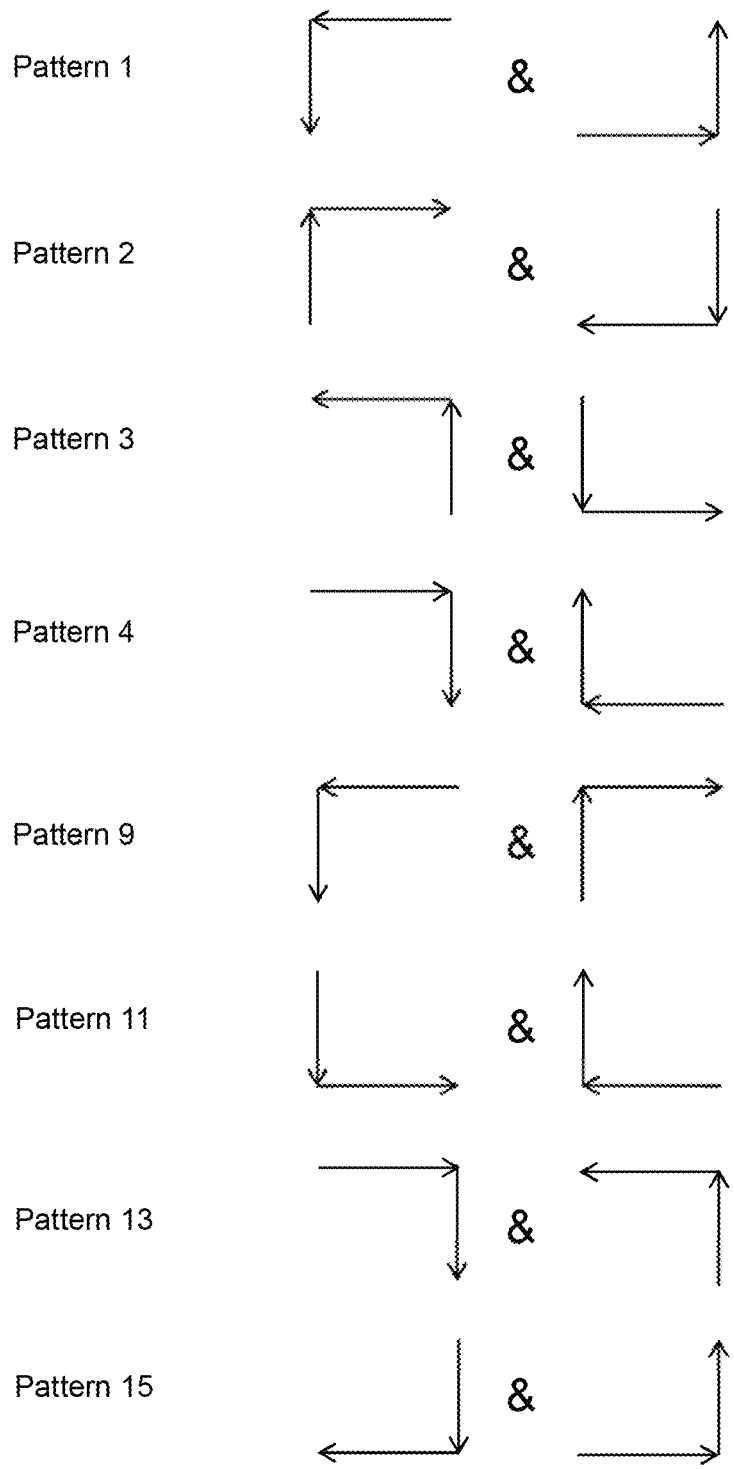
FIG. 8E is a diagram obtained by extracting a combination of directions of line segments around corner points forming the corner pair candidate.

FIG. 8E shows a combination of directions of line segments around a corner point forming a corner pair candidate. As described with reference to FIGS. 8A to 8D, the directions of the line segments around the corner points forming the corner pair candidates are limited to the eight patterns shown in FIG. 8E. Therefore, when specifying a corner pair candidate in S402, the computer system 116 may set only line segment combinations of the eight patterns shown in FIG. 8E as processing targets. Accordingly, the processing of specifying a corner pair candidate can be simplified.

Figure 9A:
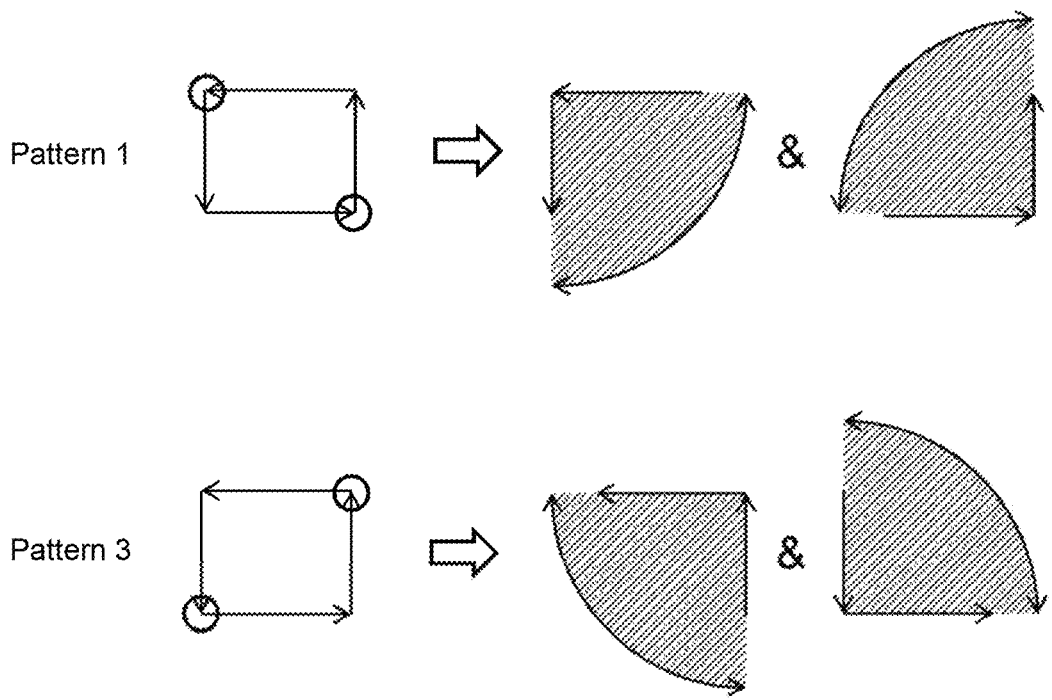
FIG. 9A shows an example of narrowing down corner pair candidates in S403.

FIG. 9A shows an example of narrowing down corner pair candidates in S403. In the pattern 1 of FIG. 8A, the upper left corner point and the lower right corner point are set as the corner pair candidate, so that these two corner points may be present only in areas indicated by shaded parts of FIG. 9A. Therefore, the computer system 116 searches for a corner pair candidate corresponding to the line segment combination of the pattern 1 from the shaded areas. It is not necessary to search for an outside of the shaded area. The same also applies to FIGS. 9B to 9D. In a case where corner points of the counterpart line segment pair are present in the same area, the two corner points are adopted as targets for which the inter-corner point distance is measured. The same also applies to FIGS. 9B to 9D. A size of the shaded area (radius of a sector) is determined in advance as a distance threshold. A user may input the distance threshold. The same also applies to FIGS. 9B to 9D. The search is performed in the same manner for the pattern 2 and the subsequent patterns in FIG. 8A. FIG. 9A shows only an example of the pattern 3.

FIG. 9B shows an example of narrowing down corner pair candidates in S403. In the pattern 5 of FIG. 8B, the lower right corner point of the first protruding pattern and the upper left corner point of the second protruding pattern are set as the corner pair candidate, so that these two corner points may be present only in areas indicated by shaded parts. Therefore, the computer system 116 searches for a corner pair candidate corresponding to the line segment combination of the pattern 5 from the shaded areas. The search is performed in the same manner for the pattern 6 and subsequent patterns in FIG. 8B.

Figure 9C:
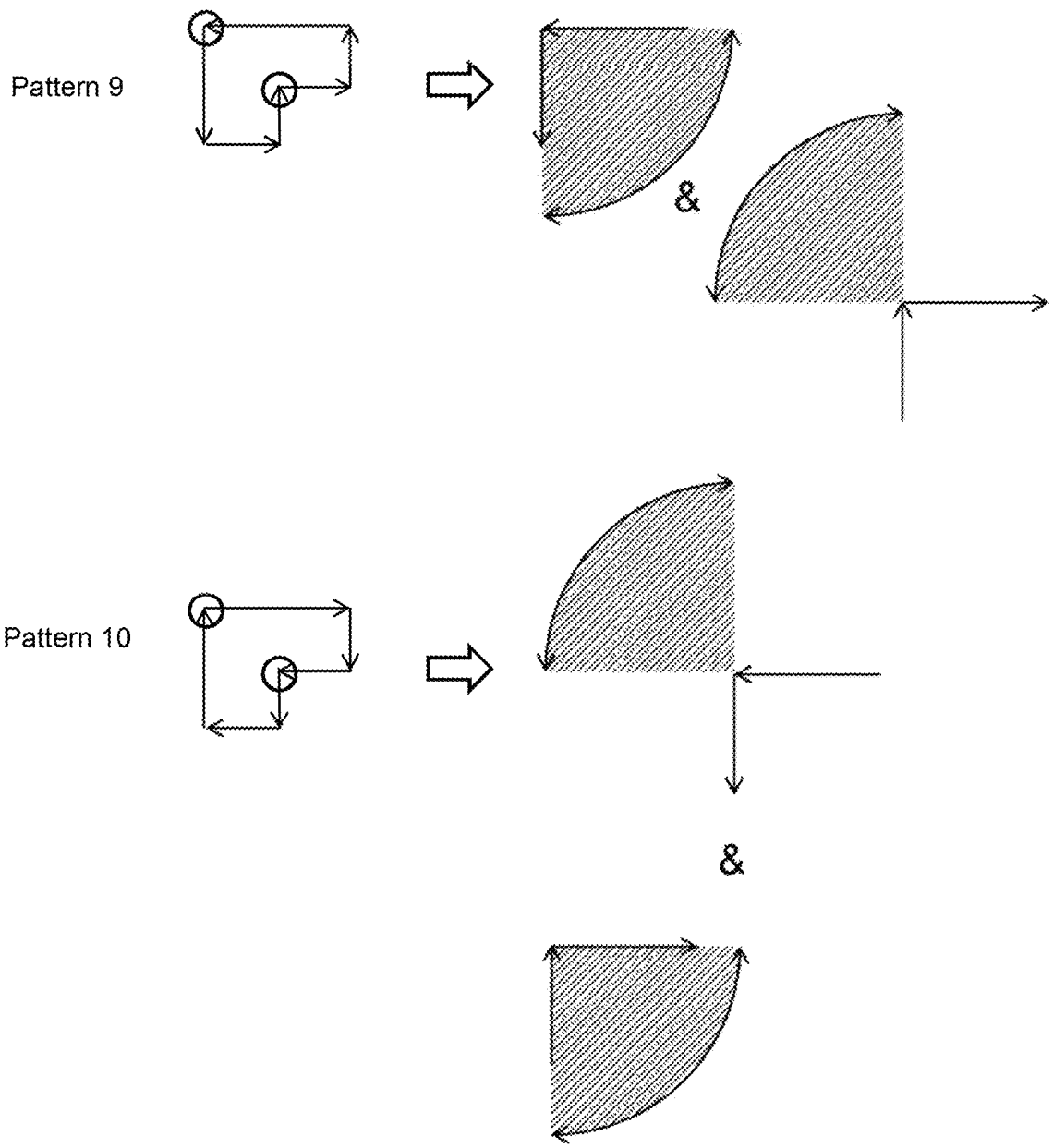
FIG. 9C shows an example of narrowing down corner pair candidates in S403.

FIG. 9C shows an example of narrowing down corner pair candidates in S403. In the pattern 9 of FIG. 8C, the upper left corner point and the lower right corner point are set as the corner pair candidate, so that these two corner points may be present only in areas indicated by shaded parts of FIG. 9C. Therefore, the computer system 116 searches for a corner pair candidate corresponding to the line segment combination of the pattern 9 from the shaded areas. The search is performed in the same manner for the pattern 10 and the subsequent patterns in FIG. 8C. FIG. 9C shows only an example of the pattern 10.

Figure 9D:
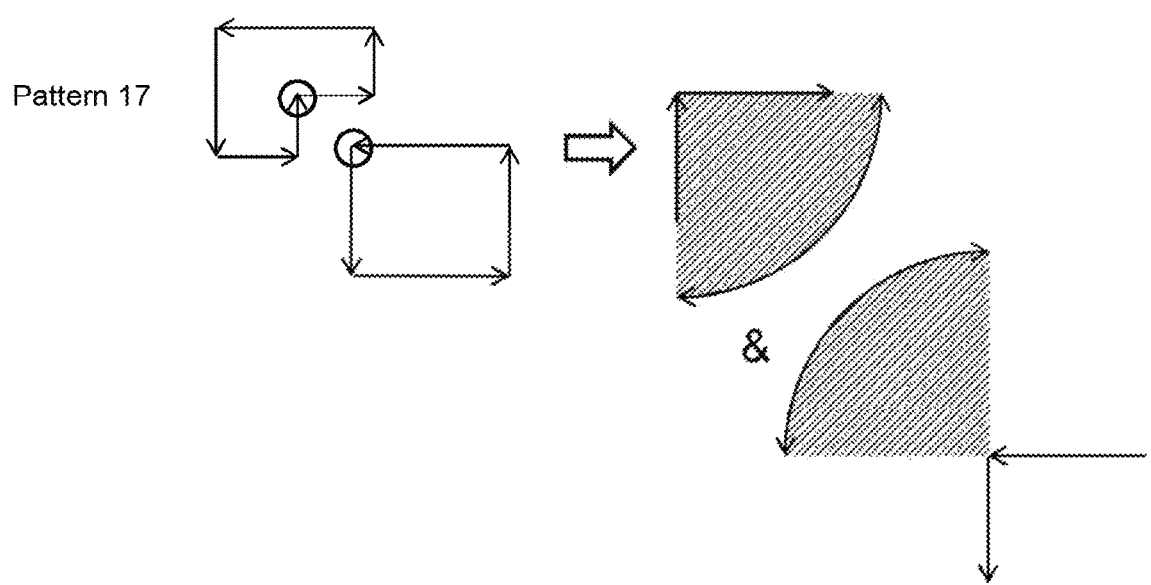
FIG. 9D shows an example of narrowing down corner pair candidates in S403.

FIG. 9D shows an example of narrowing down corner pair candidates in S403. In the pattern 17 of FIG. 8D, the lower right corner point of the first protruding pattern and the upper left corner point of the second protruding pattern are set as the corner pair candidate, so that these two corner points may be present only in areas indicated by shaded parts. Therefore, the computer system 116 searches for a corner pair candidate corresponding to the line segment combination of the pattern 17 from the shaded areas. The same search is performed for the pattern 17 and the subsequent patterns in FIG. 8D.

FIG. 9E shows results of organizing FIGS. 9A to 9D. According to FIGS. 9A to 9D, in S403, (a) in a case where the computer system 116 searches for two diagonally arranged corner points in one closed area pattern, it is enough to perform a search within a range indicated by eight combinations on an upper part of FIG. 9E, and (b) in a case where the computer system 116 searches for two corner points arranged in a manner of facing each other, each of which is located in a respective one of two patterns, it is enough to perform a search within a range indicated by eight combinations on a lower part of FIG. 9E. Accordingly, the corner pair candidates can be narrowed down, and the processing for narrowing down the corner pair candidates can be simplified.

Figure 10:
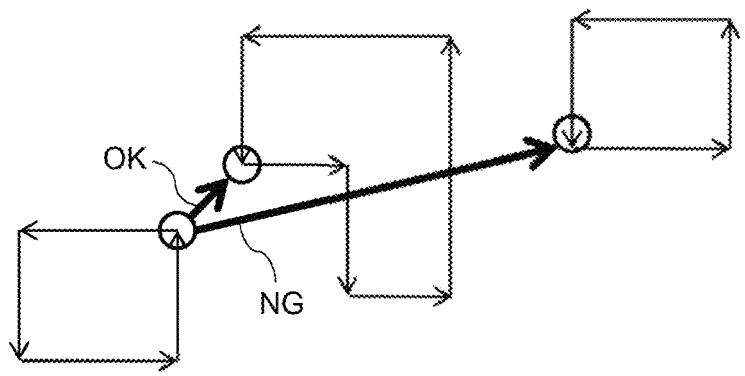
FIG. 10 shows a specific example of S404.

FIG. 10 is a diagram showing a specific example of S404. In FIG. 10, two corner pair candidates are present around a lower left corner point. When two corner points forming a corner pair candidate are connected by a line segment, and the line segment intersects another shape pattern, the two corner points are excluded from the corner pair candidates ("NG" in FIG. 10).

Figure 11:
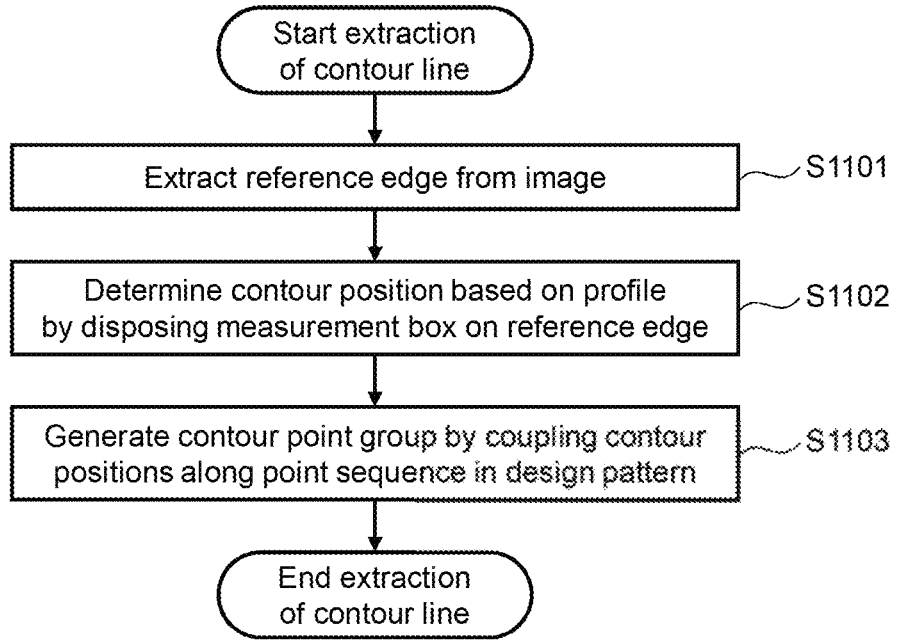
FIG. 11 is a flowchart illustrating details of S208.

FIG. 11 is a flowchart illustrating details of S208. As a method of extracting a contour line of an actually formed shape pattern, any known technique can be used, and FIG. 11 shows an example thereof. First, a reference edge is detected from an SEM image obtained by capturing an image of a pattern as a measurement target (S1101). Contour positions are determined based on a line profile of the reference edge acquired in S1101 (S1102). A contour point group is generated by coupling the contour positions along a target pattern point sequence in the design data (S1103).

FIG. 12 is a diagram showing a specific example of S210. The corner points on the actually formed shape pattern do not always have the smallest distance. Therefore, the inter-corner point distance is calculated for any number (for example, the number designated by the user) of corner points or all combinations of corner points with the corner points on the shape pattern as a center. The computer system 116 adopts two corner points having the smallest distance among the above corner points as a final corner pair within the predetermined range.

First Embodiment: Summary

The pattern inspection and measurement system 100 according to the first embodiment specifies a corner point by specifying a corner pair candidate on the design data and specifying a relative positional relation between the corner pair candidate and a contour line corresponding to a corner pair candidate on an actually formed shape pattern. Accordingly, the corner points on the actual pattern can be specified with a high accuracy.

The pattern inspection and measurement system 100 according to the first embodiment excludes a corner point formed by a minute step from the corner pair candidate (see FIG. 6A). Accordingly, the processing of searching for a corner pair candidate can be reduced, and inspection processing based on the inter-corner point distance can be completed rapidly.

When specifying a corner pair candidate, the pattern inspection and measurement system 100 according to the first embodiment extracts line segment pairs forming two diagonally arranged corner points in one closed area pattern (see FIGS. 8A and 8C), and sets only a corner point pair formed by the line segment pairs as a corner pair candidate. Further, only a range within which the corner point pair formed by the line segment pairs can be present is set as a search range of the corner pair candidate (see FIGS. 9A and 9C). Accordingly, the processing of searching for a corner pair candidate can be reduced, and inspection processing based on the inter-corner point distance can be completed rapidly.

When specifying a corner pair candidate, the pattern inspection and measurement system 100 according to the first embodiment extracts line segment pairs forming two corner points which are arranged in a manner of facing each other and each of which is located in a respective one of two closed area patterns (see FIGS. 8B and 8D), and extracts only a corner point pair formed by the line segment pairs as the corner pair candidate. Further, only a range within which the corner point pair formed by the line segment pairs can be present is set as a search range of the corner pair candidate (see FIGS. 9B and 9D). Accordingly, the processing of searching for a corner pair candidate can be reduced, and inspection processing based on the inter-corner point distance can be completed rapidly.

In order to distinguish between a protruding pattern and a recessed pattern, the pattern inspection and measurement system 100 according to the first embodiment assigns a rotation direction of line segments forming a corner point to the design data as an additional attribute (see FIG. 3). Accordingly, the corner pair candidate can be specified while identifying a three-dimensional shape pattern on the design data which is two-dimensional data.

In a case where a line segment connecting corner points intersects a shape pattern, the pattern inspection and measurement system 100 according to the first embodiment excludes the corner points from the corner pair candidates (see FIG. 10). Accordingly, only corner points within the smallest distance from corner points of interest are specified as the corner pair candidate, so that the inspection processing based on the inter-corner point distance can be reduced.

In a case where a plurality of corner points forming a corner pair candidate are present within a reference threshold range, the pattern inspection and measurement system 100 according to the first embodiment finally adopts, as a corner pair candidate, only a corner point pair whose inter-corner point distance is a difference point among the corner points (see FIG. 12). Accordingly, the inspection processing based on the inter-corner point distance can be reduced.

Second Embodiment

In the first embodiment, all corner pair candidates that are present in the ranges shown in FIGS. 9A to 9E are extracted. In a second embodiment of the disclosure, an operation example of narrowing down the corner pair candidates present in the range described in FIGS. 9A to 9E in advance according to the inter-corner point distance will be described. The configuration of the pattern inspection and measurement system 100 is the same as that of the first embodiment, so that differences in the search range will be mainly described below.

After S404, the computer system 116 further executes the following processing. Corner points with the normal attribute that are present within the ranges shown in FIGS. 9A to 9E are extracted. The computer system 116 adopts only two corner point pairs having the shortest inter-corner point distance among the extracted corner points as a corner pair candidate, and excludes the other corner points from the corner pair candidates.

After S404, the computer system 116 further executes the following processing. Corner point groups with the dense attribute that are present within the ranges shown in FIGS. 9A to 9E are extracted. There are two extraction methods below.

The computer system 116 adopts, as a corner pair candidate, only two corner point pairs having the shortest inter-corner point distance among corner points belonging to the same dense corner point group, and excludes the other corner points from the corner pair candidates (method 1). The computer system 116 sets, as a corner point, only a corner point located at a center among the corner points belonging to the same dense corner point group, and excludes the other corner points from the corner points (method 2). The dense corner point group can be set as one corner point by using the method 2, so that it is possible to reduce the time for searching for two corner point pairs having the shortest inter-corner point distance. As long as the corner points belong to the same dense corner point group, it is considered that a difference is small regardless of which point is the corner point. However, in the second embodiment, a point located at a center of a dense area, which is considered to have the largest difference in the dense area, is set as the corner point.

According to the above method, the computer system 116 can narrow down the corner pair candidates in advance. Accordingly, the inspection processing based on the inter-corner point distance can be reduced.

Third Embodiment

FIG. 13 is an example of a screen interface (GUI) provided by the computer system 116. The computer system 116 can display GUIs such as screens 1301 and 1302 on a display device such as a display in the input/output device 121.

The screen 1301 is a screen for displaying (1) a shape pattern 1303 on the design data, (2) a corner pair candidate 1304 specified on the design data, (3) a line segment 1305 connecting corner pairs, and the like.

The screen 1302 is a screen for displaying (1) a contour line 1306 of an actually formed pattern, (2) estimated positions 1307 of corner points, (3) a line segment 1308 connecting the estimated positions of the corner points, (4) an inter-corner distance 1309, and the like.

The user can also switch a screen between the screens 1301 and 1302. Further, the design data and the actual pattern may be displayed together.

<Modification of Disclosure>

The disclosure is not limited to the embodiments described above, and has various modifications. For example, the embodiments described above have been described in detail for easy understanding of the disclosure, and the invention is not necessarily limited to those including all the configurations described above. A part of a configuration of an embodiment may be replaced with a configuration of another embodiment, or the configuration of another embodiment may also be added to the configuration of the embodiment. A part of the configuration of each embodiment may be added to, deleted from, or replaced with another configuration.

In the above embodiment, in a case where the calculated distance between the corner points deviates from the design data by a reference value or more, the computer system 116 may output an alert or the like indicating the deviation. For example, the alert may be presented on the GUI shown in FIG. 13, or may be output in another format. In addition, an index value indicating a quality of a pattern, such as an amount of deviation from an amount of the design data, may be output.

In the embodiments described above, the operation processing unit 117 and the image processing unit 118 may be implemented by hardware such as a circuit device for implementing the functions, or may be implemented by software for implementing the functions, which is executed by a processor such as a central processing unit (CPU). Similarly, the operation processing unit 112 and the control unit 113 can be implemented by hardware or software executed by a processor.

The SEM 101 is exemplified as a device for acquiring the image of the shape pattern formed on the sample 107 in the above embodiment, but the disclosure is not limited thereto. Other devices may be used as long as the image of the shape pattern can be processed by the computer system 116 to specify the corner point.

In the above embodiment, a semiconductor sample is exemplified as an example of the sample 107, but the disclosure is not limited thereto, and may be applied to a shape pattern formed on other samples.

REFERENCE SIGNS LIST

100: pattern inspection and measurement system
101: scanning electron microscope
102: electron beam column
103: electron source
104: electron beam
105: vacuum sample chamber
106: XY stage
107: sample
108: secondary electron or backscattered electron
109: A/D converter
110: network
111: computer system
112: operation processing unit
113: control unit
114: storage unit
115: network
116: computer system
117: operation processing unit
118: image processing unit
119: storage unit
120: design information database
121: input/output device

The invention claimed is:

1. A pattern inspection and measurement apparatus for inspecting or measuring a shape pattern formed on a sample, the apparatus comprising:
a computer system configured to detect a corner pattern including a corner point in the shape pattern based on a captured image of the shape pattern, wherein
the computer system acquires a coordinate and a shape of the corner pattern from design data of the shape pattern,
the computer system specifies two corner points whose distance between each other is within a predetermined distance, as a corner pair candidate based on the coordinate and the shape of the corner pattern acquired from the design data, and
the computer system specifies coordinates of the two corner points on the shape pattern forming the corner pair candidate in accordance with a relative relation between a position of the shape pattern forming the corner pair candidate and a position of the corner pair candidate on the design data.

2. The pattern inspection and measurement apparatus according to claim 1, wherein
the computer system extracts a first corner point and a second corner point from the corner patterns, and
the computer system excludes at least one of the first corner point and the second corner point from the corner pair candidate in a case where a distance between the first corner point and the second corner point is less than a first threshold.

3. The pattern inspection and measurement apparatus according to claim 1, wherein
the computer system extracts, as an internal corner point pair in one corner pattern forming a closed area formed by connecting line segments, two corner points, whose adjacent corner points are excluded, in the one corner pattern, and
the computer system specifies the extracted internal corner point pair as the corner pair candidate.

4. The pattern inspection and measurement apparatus according to claim 3, wherein
when extracting the internal corner point pair,
the computer system performs a search, on the design data, within only a range in which there are two corner points whose adjacent corner points are excluded in the closed area formed by connection the line segments.

5. The pattern inspection and measurement apparatus according to claim 3, wherein
the design data is data in which a two-dimensional shape is recorded,
the computer system distinguishes, in the shape patterns, between a protruding shape pattern formed by protruding along a normal direction of a two-dimensional plane and a depressed shape pattern formed by depression, and
the computer system extracts the internal corner point pair for each of the protruding shape pattern and the depressed shape pattern.

6. The pattern inspection and measurement apparatus according to claim 3, wherein
the computer system extracts, as a non-target pair, corner points whose distance between each other is less than a first threshold among the corner points,
the computer system extracts, as a dense corner group, corner points whose distance between each other is equal to or greater than the first threshold and less than a second threshold among the corner points,
the computer system specifies, as the corner pair candidate, two corner points having the smallest distance between each other among corner points obtained by excluding the non-target pair and the dense corner group from the internal corner point pairs,
the computer system specifies, as the corner pair candidate, two corner points having the smallest distance between each other among the corner points in the internal corner point pairs and in the dense corner group, or the computer system extracts one point from the dense corner group among the corner points in the internal corner point pairs and in the dense corner group, and specifies the extracted corner point as the corner pair candidate.

7. The pattern inspection and measurement apparatus according to claim 1, wherein
the computer system extracts, as an external corner point pair, a first corner point in one of two corner patterns each forming a closed area formed by connecting line segments and a second point in another one of the two corner patterns and arranged in a manner of facing the first corner point, and
the computer system specifies the extracted external corner point pair as the corner pair candidate.

8. The pattern inspection and measurement apparatus according to claim 7, wherein
when extracting the external corner point pair,
the computer system performs a search, on the design data, within only a range in which there are two corner points arranged in a manner of facing each other, among corner points respectively located in the two corner patterns each forming the closed area formed by connecting line segments.

9. The pattern inspection and measurement apparatus cording to claim 7, wherein
the design data is data in which a two-dimensional shape is recorded,
the computer system distinguishes, in the shape patterns, between a protruding shape pattern formed by protruding along a normal direction of a two-dimensional plane and a depressed shape pattern formed by depression, and the computer system extracts the external corner point pair for each of the protruding shape pattern and the depressed shape pattern.

10. The pattern inspection and measurement apparatus according to claim 7, wherein the computer system extracts, as a non-target pair, corner points whose distance between each other is less than a first threshold among the corner points, the computer system extracts, as a dense corner group, corner points whose distance between each other is equal to or greater than the first threshold and less than a second threshold among the corner points, the computer system specifies, as the corner pair candidate, two corner points having the smallest distance between each other among corner points obtained by excluding the non-target pair and the dense corner group from the external corner point pairs, the computer system specifies, as the corner pair candidate, two corner points having the smallest distance between each other among the corner points in the external corner point pairs and in the dense corner group, or the computer system extracts one point from the dense corner group among the corner points in the external corner point pairs and in the dense corner group, and specifies the extracted corner point as the corner pair candidate.

11. The pattern inspection and measurement apparatus according to claim 1, wherein the computer system extracts a third pattern and a fourth pattern from the corner patterns, and the computer system excludes at least one of the third pattern and the fourth pattern from the corner pair candidate in a case where a line segment recorded in the design data intersects a line segment connecting the third pattern and the fourth pattern.

12. The pattern inspection and measurement apparatus according to claim 1, wherein the computer system calculates and outputs a distance between two corner points, whose coordinates are specified, as a distance between the two corner points forming the corner pair candidate.

13. The pattern inspection and measurement apparatus according to claim 12, wherein the computer system specifies a plurality of the corner pair candidates, and in a case where a distance between one corner point forming a first corner pair candidate and one corner point forming a second corner pair candidate, among the plurality of corner pair candidates, is within a reference threshold, and a distance between another corner point forming the first corner pair candidate and another corner point forming the second corner pair candidate is within the reference threshold, the computer system extracts, among all combinations of the corner points in the first corner pair candidate and the corner points in the second corner pair candidate, only corner points having the smallest distance between each other, and excludes the other corner points from the corner pair candidates.

14. The pattern inspection and measurement apparatus according to claim 12, wherein the computer system includes a screen interface configured to display, on a screen, two corner points forming the corner pair candidate and a distance between the corner points.

15. A pattern inspection and measurement program for causing a computer to execute processing of inspecting or measuring a shape pattern formed on a sample, the pattern inspection and measurement program causing the computer to execute:

a step of detecting a corner pattern including a corner point in the shape pattern, based on a captured image of the shape pattern, wherein the step of detecting the corner pattern includes the following steps executed by the computer:

acquiring a coordinate and a shape of the corner pattern from design data of the shape pattern;

specifying two corner points whose distance between each other is within a predetermined distance, as a corner pair candidate based on the coordinate and the shape of the corner pattern acquired from the design data; and forming the corner pair candidate in accordance with a relative relation between a position of the shape pattern forming the corner pair candidate and a position of the corner pair candidate on the design data.

* * * * *